US008225811B1

(12) United States Patent
Lieber

(10) Patent No.: US 8,225,811 B1
(45) Date of Patent: Jul. 24, 2012

(54) APPARATUS FOR THE REMOVAL OF MOISTURE FROM A COMPRESSED AIR TANK

(76) Inventor: Max Lieber, Houston, TX (US)

( * ) Notice: Subject to any disclaimer, the term of this patent is extended or adjusted under 35 U.S.C. 154(b) by 1117 days.

(21) Appl. No.: 12/062,342

(22) Filed: Apr. 3, 2008

(51) Int. Cl.
*F16K 15/04* (2006.01)
*F16K 17/12* (2006.01)
*F16K 21/08* (2006.01)
*F16K 31/12* (2006.01)
*F16T 1/12* (2006.01)

(52) U.S. Cl. ............... 137/203; 137/493.9; 137/514; 137/533.11; 137/592; 251/64; 138/42

(58) Field of Classification Search ............ 137/247.21, 137/519.5, 533.11, 178, 183, 177, 514, 493, 137/493.9, 203, 204, 592; 251/60, 64; 138/37, 138/40, 42
See application file for complete search history.

(56) References Cited

U.S. PATENT DOCUMENTS

| | | | |
|---|---|---|---|
| 2,662,551 A * | 12/1953 | Wilkerson | 251/23 |
| 3,004,549 A * | 10/1961 | Temple | 137/204 |
| 3,224,118 A | 12/1965 | Hutelmeyer | |
| 3,732,890 A | 5/1973 | Smith | |
| 3,841,349 A | 10/1974 | Todd | |
| 3,845,778 A | 11/1974 | Bridigum | |
| 4,069,840 A | 1/1978 | Brown et al. | |
| 4,633,681 A | 1/1987 | Webber | |
| 6,698,446 B2 | 3/2004 | Cornwell | |
| 7,014,072 B2 * | 3/2006 | Yquel | 222/402.1 |
| 7,069,946 B2 | 7/2006 | Clare | |
| 2005/0121084 A1 | 6/2005 | Andersson | |

* cited by examiner

*Primary Examiner* — John Rivell
*Assistant Examiner* — Atif Chaudry
(74) *Attorney, Agent, or Firm* — Egbert Law Offices PLLC

(57) ABSTRACT

An apparatus for facilitating the removal of moisture from a compressed air tank has a tank with an interior volume, a tubular member positioned in communication with the tank and having an end adjacent the bottom of the tank, an air compressor interconnected to the tubular member for passing compressed air into the interior volume of the tank, a check valve positioned at an opposite end of the tubular member, a head pressure relief valve in communication with the tubular member, and a pressure switch cooperatively connected to the air compressor. The pressure switch opens the head pressure relief valve when an air pressure in the tank reaches a desired level so as to cause air and water in the tank to pass through the tubular member. The check valve serves to stop the passing of air and water after a period of time.

16 Claims, 3 Drawing Sheets

APPARATUS FOR THE REMOVAL OF MOISTURE FROM A COMPRESSED AIR TANK

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to air compressors. More particularly, the present invention relates to apparatus for the removal of moisture that accumulates within the compressed air tank. Additionally, the present invention relates to check valving system whereby moisture is removed from the compressed air tank when the head pressure relief valve opens.

2. Description of Related Art Including Information Disclosed Under 37 CFR 1.97 and 37 CFR 1.98

An air compressor system is often pressurized with a motor-driven compressor controlled by a pressure-operated switch that senses pressure in an air receiver, such as a pressure vessel. The compressor forces compressed air through a discharge tube and a check valve which is connected to a pressure vessel. The pressure vessel serves as a reservoir for storing the compressed air. When the pressure of the compressed air being produced and stored in the pressure vessel reaches a preselected maximum level, the pressure switch shuts off the compressor motor to stop further pressurization. The lack of pressure from the compressor allows the check valve to close and prevents air from flowing from the air receiver back to the discharge tube when pressurization stops. Pressurized air would still remain in the discharge tube and the head of the compressor.

As air is consumed from the pressure vessel, the level of pressure remaining within the pressure vessel is reduced. When the pressure in the pressure vessel falls to a preselected minimum level, the pressure switch again operates the compressor to resume pressurization. However, if the remaining pressure in the discharge tube and in the head of the compressor is not removed prior to resuming pressurization, the compressor must overcome the added load from this remaining pressure in addition to the load of initiating pressurization. This can result in adverse system effects on the compressor motor such as motor stalling or electrical circuit overloading in the circuit in which the motor is stalled.

In order to prevent this, a head pressure relief valve is operated by the pressure switch to relieve the pressure from the discharge tube when the pressure within the pressure vessel rises to a preselected maximum pressure level. Typically, the head pressure relief valve is connected to the discharge tube through an additional hose, tubing or other mechanical communication means.

Various equipment systems include pneumatic components. For example, pneumatic tools comprising important class of manufacturing, construction, maintenance and repair tooling. A typical system includes a compressor, one or more pneumatic tools and a respective flexible hose connecting each tool to the compressed gas source. In addition to ambient air, other gases, such as nitrogen, are suitable in pneumatic power operations.

In manufacturing, constructing, maintenance and repair operations that use pneumatic tooling, the connecting hoses are relatively long in order to accommodate freedom of movement by the workers. The tools are somewhat portable and are tethered to the compressed gas source by these connecting hoses.

A major problem affecting such compressed air systems is the accumulation of moisture within the compressed air tank. Moisture is an inherent result of the compressing of air and, as such, a small amount of moisture will inherently accumulate within the bottom of the compressed air tank. Conventional compressed air systems will include a drain connection at the bottom of the compressed air tank. In normal operations, after a certain period of time, a worker will open the drain so as to allow the moisture to be removed from the compressed air tank. Unfortunately, since the drain is located at the bottom of the tank and it is often in an inconvenient location, workers will tend to ignore this requirement and will allow further moisture to be accumulated within the compressed air tank. As such, a need has developed so as to be able to remove moisture from the interior of compressed air tanks without the need for the opening of the drain connection.

If an excessive amount of moisture should accumulate within the compressed air tank, then the passage of moisture, along with compressed air, can often effect damage to pneumatic tools and to the system in general. Fundamentally, the accumulation of moisture will reduce the amount of compressed air that can be accumulated within the compressed air tank. As such, the compressor pump will have to operate more often than desired in order to maintain the pressure within the tank at a desired level. Ultimately, system failure can occur if too much moisture is accumulated within the compressed air tank. Once again, it is important to be able to remove the accumulated moisture within the compressed air tank in a simple, convenient and effective manner.

A check valve is used so as to stop the passage of air outwardly of the head pressure relief valve when a sufficient amount of pressure is relieved from the compressor pump and from the compressed air tank. Unfortunately, the action of this check valve does not allow any moisture to be emitted through the head pressure relief valve. As such, a need has developed so as to delay the action of the check valve in a proper manner so that moisture and air can be released through the head pressure relief valve.

In the past, various patents have been issued relating to check valves and air compressor system. For example, U.S. Pat. No. 3,224,118, issued on Dec. 14, 1965 to J. V. Hutelmyer, describes an air brake tank. The tank has a single, closed shell with a partition which divides the interior of the tank into wet and dry compartments. A small, compact, ball-type check valve is mounted on the tank in a position to communicate with both compartments in the vicinity of the partition. When air is required in the dry compartment, the ball is blown off of its seat by the air pressure in the wet compartment and to permit the compressed air in the wet compartment to pass freely into the dry compartment. In the event of any air reduction in the wet compartment, the ball immediately seats itself in response to air compressor in the dry compartment and automatically locks the air in the dry compartment.

U.S. Pat. No. 3,841,349, issued on Oct. 15, 1974 to T. J. Todd, shows a trickle rate fluid outlet. A valve cage extends upwardly from a pressurized fluid source and has a lower inlet valve seat and an upper outlet valve seat. The starting of flow through the cage lifts a ball from the lower seat to close the upper seat but lifts the ball at only a moderate rate with a prolonged initial purging of the valve cage.

U.S. Pat. No. 3,732,890, issued on May 15, 1973 to D. G. Smith, describes an unloader valve for air compressors. This unloader valve is provided at the outlet of an air compressor for subjecting the compressor to a limited back pressure until the compressor gains enough speed to be able to pick up the full load. Thereafter, the device operates to open the passage to the compressed air tank. This device is provided with a casing having a main passage therethrough in which there is positioned a check valve which controls the passage to the compressed air tank. This device also includes a cylinder which is connected to the casing by a restriction hole and the cavity of this cylinder is normally open to the atmosphere. A valve member is provided in the cylinder cavity responsive to the flow of air into the cavity through said restriction hole. This valve member functions to close an exhaust hole when the air compressor approaches delivery of normal compressed air output.

U.S. Pat. No. 3,845,778, issued on Nov. 5, 1974 to R. J. Bridigum, shows an automatic drain valve for periodically draining accumulated moisture condensation and other contaminants from a fluid pressure storage reservoir upon a reduction of the pressure of the fluid in the reservoir from a chosen pressure to a lower chosen pressure independently of a governor device which controls the operation of a fluid compressor that supplies fluid under pressure to the storage reservoir.

U.S. Pat. No. 4,069,840, issued on Jan. 24, 1978 to Brown et al., shows a check valve for permitting fluid flow in one direction and for preventing flow in the reverse direction. This check valve has a tubular body having a longitudinal flowbore therethrough. An annular seat is located within the flowbore. An inclined cylindrical pocket communicates with the flowbore. A ball member is movable between the pocket and sealing engagement with the seat in the flowbore to permit fluid to flow in one direction but blocking flow in the reverse direction.

U.S. Pat. No. 4,633,681, issued on Jan. 6, 1987 to R. C. Webber, teaches a refrigerant expansion device that has a housing with an inlet tube for connection to the liquid line from the condenser and an outlet tube for connection to the evaporator. The outlet tube has a valve-like seat in its inner end and orifice grooves formed in the seat. A steel ball is movably disposed in the housing such that liquid refrigerant during compressor operation forces the ball into the seat so as to form an expansion orifice between the ball and the seat.

U.S. Pat. No. 6,698,446, issued on Mar. 2, 2002 to J. P. Cornwell, provides a check valve with an elongated body and a hole extending from an inlet end to an outlet end. A piston assembly is mounted within the body. This piston assembly includes a piston, a check valve and a piston spring. The piston spring biases the piston to a first piston location preventing air from flowing from the inlet toward the outlet end. The check valve seal can be positioned on the piston assembly to seal against either a check valve seat or the inside diameter of the hole to restrict air flow when the piston is in the first piston location. Movement of the piston to a downstream piston location can remove the check valve seal from the check valve seat so as to allow air to flow from the inlet end toward the outlet end.

U.S. Pat. No. 7,069,946, issued on Jul. 4, 2006 to E. I. Clare, shows a slow-release check valve for a pneumatic system. This slow-release check valve has a compressed gas source and a pneumatic device. The pneumatic devices includes a body with a proximal supply end and a distal power end. Supply and power couplings are mounted on the body supply and power ends respectively and are adapted for coupling with a compressed gas source and a pneumatic device. The body includes a passage with a frustoconical configuration with a minimum-diameter supply end adjacent to the supply coupling and a maximum-diameter power end adjacent to the power coupling. A ball is movably located within the passage and engages the body in a closed position. The ball is biased towards its closed position by a spring. For power operation, the ball is in an open position whereby gas flows around same. Disconnecting the hose causes the ball to move to its closed position and allows compressed gas to slowly dissipate from the disconnected hose.

U.S. Patent Publication No. 2005/0121084, published on Jun. 9, 2005 to B. Andersson, shows a ball check valve that comprises a housing having walls defining a fluid inlet, a fluid outlet, and a chamber communicating with the inlet and with the outlet. The ball check valve includes a spherical hollow ball housing a plurality of spherical shock absorbing members that stabilize the spherical hollow ball during operation of the valve. The spherical hollow ball moves between a first, flow-impeding position adjacent the inlet and a second position spaced from the inlet laterally of a fluid passageway in the chamber.

It is an object of the present invention to provide an apparatus for effectively removing moisture accumulation from an interior of a pressure tank.

It is another object of the present invention to provide an apparatus that allows moisture to be released through the head pressure relief valve by delaying the opening and closing of the ball-type check valve.

It is a further object of the present invention to provide an apparatus that effectively prevents moisture accumulation from occurring in the pressure tank.

It is another object of the present invention to provide an apparatus which eliminates the requirements for workers to open and close the drain associated with the compressed air tank.

It is still a further object of the present invention to provide an apparatus that effectively removes moisture from the interior of a pressure tank and minimizes the power requirements of the compressor pump.

These and other objects and advantages of the present invention will become apparent from a reading of the attached specification and appended claims.

BRIEF SUMMARY OF THE INVENTION

The present invention is an apparatus for removing moisture from a compressed air tank that comprises a tank having an interior volume and a bottom, a tubular member positioned in communication with the tank and having an end adjacent the bottom of the tank, an air compressing means interconnected to the tubular member for passing compressed air into the interior volume of the tank, a check valving means positioned at an opposite end of the tubular member, a head pressure relief valve in communication with the tubular member, and a pressure switching means cooperatively connected to the air compressing means. The pressure switching means serves to open the head pressure relief valve when the air pressure in the tank reaches a desired level so as to cause air and water in the tank to pass through the tubular member. The check valving means serves to stop the passing of air and water after a period of time.

The air compressing means is connected to the tubular member by a hose. The head pressure relief valve and the pressure switching means are connected to the hose. The tubular member extends from a top of the tank toward a bottom of the tank. The check valving means is positioned adjacent the top of the tank.

In the preferred embodiment of the present invention, the tubular member has a spiral pathway formed therein. The check valving means has a ball positioned in the tubular member. This ball is movable along the spiral pathway. In particular, the spiral pathway comprises a coiled spring fixedly positioned against an inner wall of the tubular member.

The head pressure relief valve is interconnected to a hose. The check valving means has a seat connected to an end of the hose opposite the head pressure relief valve. The ball resides against the seat when the check valving means stops the passing of air and water. The ball is movable downwardly along the spiral pathway when the air compressing means passes compressed air into the interior volume of the tank.

In an alternative embodiment of the present invention, another check valve is positioned at the end of the tubular member. A first line extends from the air compressing means into the interior volume of the tank and a second line is in communication with the air compressing means and with the tubular member. The tubular member has a ball positioned therein. The check valving means comprises a first seat positioned at the opposite end of the tubular member. The another check valving means comprises a second seat positioned at the end of the tubular member. The pressure switching means causes the ball to move from the second seat toward the first seat when the pressure switching means opens. The air compressing means causes the ball to move from the first to the second seat when the air compressing means passes air into the interior volume of the tank. The first line has a check valve at an end opposite the air compressing means. The second line is connected to the first line and interconnected to the tubular member. A tank connection is positioned on the side of the second seat opposite the bottom of the tank.

DETAILED DESCRIPTION OF THE INVENTION

Figure 1:
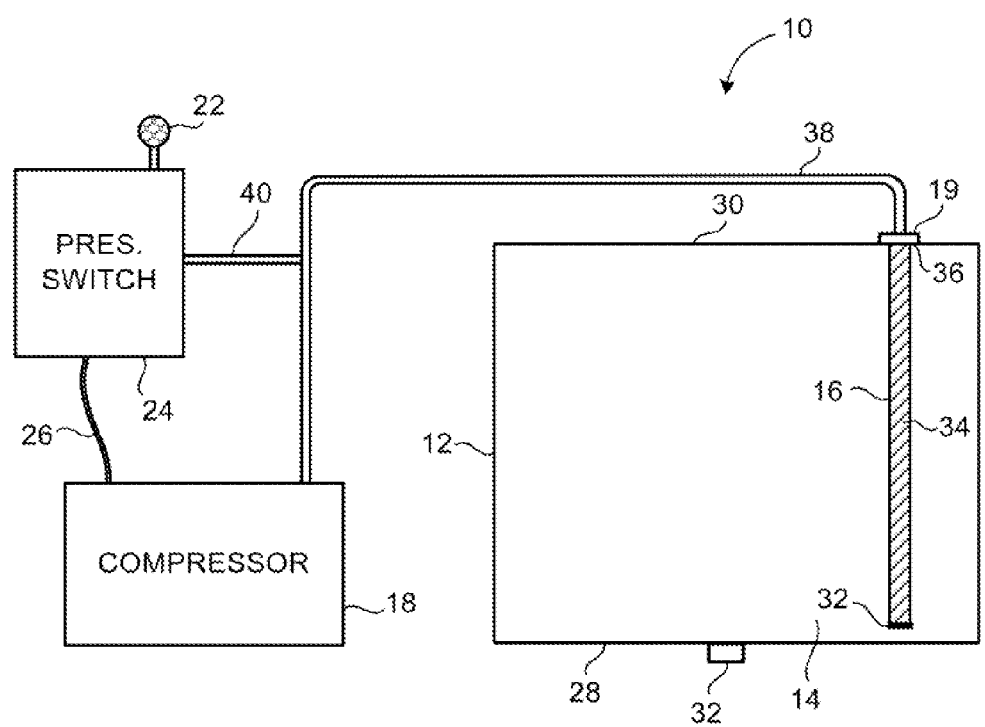
FIG. 1 is a diagrammatic illustration of the apparatus of the preferred embodiment of the present invention.

Referring to FIG. 1, there is shown the apparatus 10 for the removal of moisture from a pressure tank. The apparatus 10 includes a tank 12 having an interior volume 14, a tubular member 16 positioned in communication with the interior volume 14 of the tank 12, an air compressor 18 interconnected to the tubular member 16 so as to pass compressed air into the interior volume 14 of the tank 12, a check valve 19 positioned at an end of the tubular member 16, a head pressure relief valve 22 in communication with the tubular member 16, and a pressure switch 24 cooperatively connected to the air compressor by line 26. As can be seen, the tank 12 has a bottom 28 and a top 30. A drain connection 22 is positioned at the bottom 28 of tank 12 so as to manually allow for the removal of moisture from the interior volume 14 of tank 12. The tank 12 is in the nature of a conventional compressed air tank.

The tubular member 16 has a unique configuration in the present invention. As can be seen, a tubular member extends vertically within the interior volume 14 of tank 12. The tubular member 16 has a bottom 32 generally adjacent to the bottom 28 of tank 12. The bottom 32 of the tubular member 16 is positioned adjacent to the bottom 28 of the tank 12 so as to be in an area where moisture would accumulate within the interior volume 14 of tank 12. The tubular member 16 has a spiral pathway 34 formed longitudinally along the tubular member 16. As shown in FIG. 1, a ball is positioned at the upper end of the tubular member 16 and generally adjacent to the check valve 19. In the position shown in FIG. 1, the check valve 36 is in position so as to stop the flow of compressed air and moisture from the interior volume 14.

The check valve 19 is positioned at the top 30 of tank 12. A hose 38 is connected to the check valve 19. Hose 38 is connected at an opposite end to the air compressor 18. A branch hose 40 is connected to hose 38 and extends to the pressure switch 24 and to the head pressure relief valve 22.

With reference to FIG. 1, in normal use, the compressor 18 pumps compressed air through the check valve 19 into the interior volume 14 of tank 12. As such, it will push the ball 36 downwardly toward the bottom 32 of tubular member 16. When the pressure switch 24 cuts off the motor of the compressor 18, it also opens the head pressure relief valve 22 in order to release the head pressure of the compressor 18. At this time, compressed air and moisture will escape through the check valve 19 and outwardly through the head pressure relief valve 22. This air flows carries the ball 36 along the spiral pathway 34 up to the seat of the check valve 19 and, thereby, closes the check valve 19. Since the ball 36 follows the spiral pathway 34, air and moisture will bypass the ball 36 and escape through the check valve 19 and into the head pressure relief valve 22. As such, the apparatus 10 eliminates the use of a check valve other than check valve 19. The apparatus works perfectly on smaller air compressors. The apparatus 10 is cheaper to produce than a standard check valve and also eliminates the need for the bottom access hole for the manual drain as well as the drain valve itself. As a result, the present invention save the manufacturer several dollars per unit. It also serves the general problem of moisture build up in the storage tanks.

Figure 2:
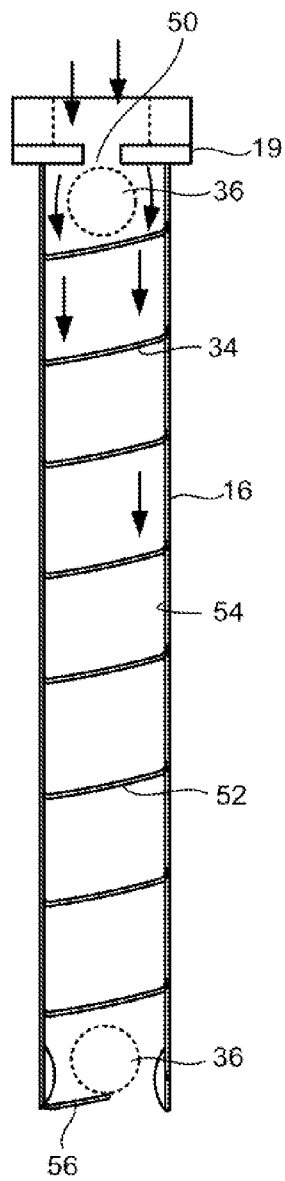
FIG. 2 is a cross-sectional view showing the check valving system as used with the moisture removal apparatus of the present invention.

FIG. 2 is a detailed illustration of the check valve assembly. As can been seen, the check valve 19 has a hole 50 formed therein. This hole 50 is aligned with the central longitudinal axis of the tubular member 16. The hose 38 will be connected to the check valve 19 and will extend over the hole 50. The hole 50 defines a seat of the check valve 19 against which the ball 36 will reside. As can be seen, the ball 36 has an outer diameter that is greater than the hole 50. As such, when the ball 36 is in its uppermost position, it will seat within the check valve 19 and close the hole 50.

The spiral pathway 34 extends from the upper portion of the tubular member 16 to the bottom 32 of the tubular member. This spiral pathway 34 is in the nature of a coil spring 52 that is affixed to the inner wall 54 of tubular member 16. The spiral spring is in a fixed position and does not flex, compress or expand. The coil spring is simply a technique whereby the spiral pathway 34 is properly formed so as to cause the ball 36 to travel in a spiral manner rather than directly through the interior of the tubular member 16. If the spiral pathway did not exist, then the ball 36 would travel very quickly from bottom 32 to the check valve 19. As such, there would be insufficient time for moisture to be effectively emitted through the open check valve 19. By following the spiral pathway 34, the ball 36 will be delayed in its movement from bottom 32 to the check valve 19 so as to allow moisture to be delivered outwardly through the hole 50 and through the head pressure relief valve 22. The coil spring 52 has an inwardly turned end 56 at bottom 32. As such, this inwardly turned end is a simple technique whereby the ball 36 is stopped at the bottom of the tubular member 16. The tubular member can be formed of a metallic or polymeric material. The coil spring 52 is, preferably, a stretched spring formed of a stainless steel material. In the preferred embodiment of the present invention, the ball 36 can be formed of nylon. However, the ball 36 can also be formed of various other suitable materials. The check valve 19 can be formed of stainless steel, brass, a polymeric material, or other suitable materials. A similar effect can be accomplished in a less effective way by using a straight long tube in a vertical position containing a heavy steel ball of smaller diameter.

Figure 3:
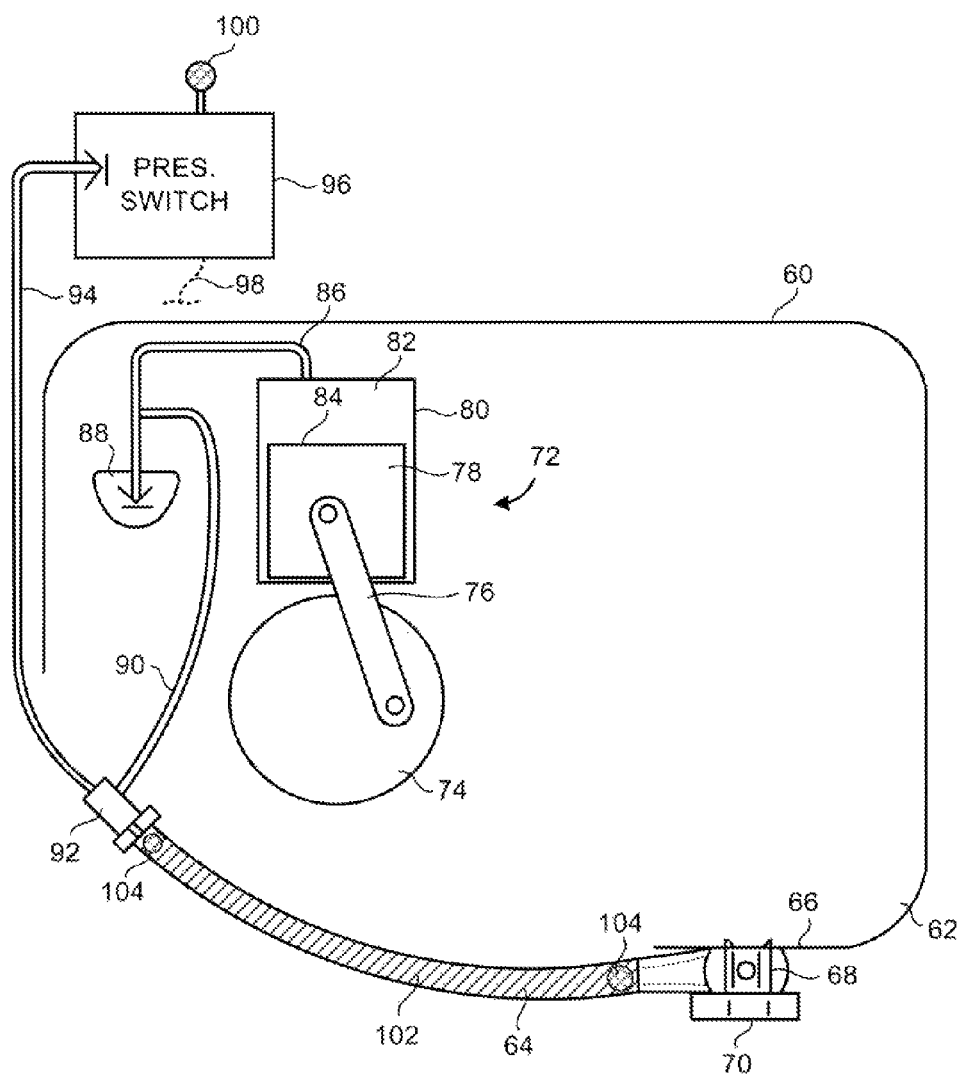
FIG. 3 is a diagrammatic illustration of an alternative embodiment of the present invention.

FIG. 3 shows an alternative embodiment of the present invention. In FIG. 3, there is shown the compressed air tank 60 having an interior volume 62. A tubular member 64 is generally positioned adjacent to the bottom 66 of the compressed air tank 60. The tubular member 64 is in valved communication with the interior volume 62 of tank 60 through the use of a check valve 68. A drain connection 70 is connected to a side of the check valve 68 opposite the bottom 66 of tank 60. An air compressor 72 is illustrated in a conventional manner. Air compressor 72 includes a motor connected to a wheel 74. Wheel 74 is connected by link 76 to a piston 78. The piston 78 is located within cylinder 80. In normal use, head pressure will accumulate in the space 82 located between the end wall of the cylinder 80 and the end 84 of the piston 78. A first line 86 extends from the cylinder 80 of the air compressor 72 so as to pass compressed air into the interior volume 62 of tank 60. A check valve 88 is located at the end of the first line 86 so as to prevent pressurized air within the interior volume 62 from passing back through the first line 86 and into the space 82 of cylinder 80. A second line 90 is connected to the first line 86 and interconnected to the air compressor 72. The second line 90 extends to a check valve 92 located at an end of the tubular member 64 from the check valve 68. A hose 94 extends from check valve 92 to the pressure switch 96 and head pressure relief valve 100. Pressure switch 96 is connected by line 98 to the motor associated with the air compressor 72 so as to switch the motor of the air compressor 72 on and off relative to the pressure within the interior volume 62 of tank 60. Pressure switch 98 also can open the head pressure relief valve 100 in the manner described hereinbefore.

It can be seen that the tubular member 64 has a spiral pathway 102 extending therealong between the check valves 68 and 92. A single ball 104 is movable between the check valves 68 and 92 relative to the air pressure. Each of the check valves 68 and 92 has a suitable seat whereby the placement of the ball 104 in proximity to the seat will open and close the respective check valves 68 and 92.

In the embodiment of the apparatus shown in FIG. 3, the air compressor 72 will compress air into the interior volume 62 of the tank 60 through the first line 86 and check valve 88. At the same time, it will apply pressure to the dual valve seat check valve. In particular, a certain amount of pressure will be delivered along the second line 90 into the check valve 92. This will cause the ball 104 to move from its position adjacent the check valve 92 to a position adjacent the check valve 68. Once the motor of the air compressor 72 stops, the head pressure relief valve 100 will open. As a result, the ball 104 will travel toward the check valve 92 by virtue of the pressure within the interior volume 62 of tank 60. Once again, all the moisture and air on the bottom 66 of tank 60 will bypass the ball 104 since this ball has to follow the path created by the spiral pathway 102. As such, the air and moisture will escape through the head pressure relief valve 100. When the pressure switch 96 causes the closing of the head pressure relief valve 100, the air compressor 72 will pass air through the first line 86, through the second line 90 so as to cause the ball 104 to move toward the check valve 68.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. An apparatus comprising:
   a tank having an interior volume and a bottom;
   a tubular member positioned in communication with said tank, said tubular member having an end adjacent said bottom of said tank;
   an air compressing means interconnected to said tubular member, said air compressing means for passing compressed air into said interior volume of said tank;
   a check valving means positioned at an opposite end of said tubular member, said tubular member having a spiral pathway formed therein, said check valving means having a ball positioned in said tubular member, said ball movable along said spiral pathway;
   a head pressure relief valve in communication with said tubular member; and
   a pressure switching means cooperatively connected to said air compressing means, said pressure switching means for opening said head pressure relief valve when an air pressure in said tank reaches a desired level so as to cause air and water in said tank to pass through said tubular member, said check valving means for stopping the passing of air and water after a period of time.

2. The apparatus of claim 1, said air compressing means being connected to said tubular member by a hose, said head pressure relief valve and said pressure switching means being connected to said hose.

3. The apparatus of claim 1, said spiral pathway comprising a coiled spring fixedly positioned against an inner wall of said tubular member.

4. The apparatus of claim 1, said head pressure relief valve interconnected to a hose, said check valving means having a seat connected to an end of said hose opposite said head pressure relief valve, said ball residing against said seat when said check valving means stops the passing of air and water.

5. The apparatus of claim 4, said ball being movable downwardly along said spiral pathway when said air compressing means passes compressed air into said interior volume of said tank.

6. An apparatus comprising:
   a tank having an interior volume and a bottom;
   a tubular member positioned in communication with said tank, said tubular member having an end adjacent said bottom of said tank;
   an air compressing means interconnected to said tubular member, said air compressing means for passing compressed air into said interior volume of said tank;
   a check valving means positioned at an opposite end of said tubular member;

a head pressure relief valve in communication with said tubular member;

a pressure switching means cooperatively connected to said air compressing means, said pressure switching means for opening said head pressure relief valve when an air pressure in said tank reaches a desired level so as to cause air and water in said tank to pass through said tubular member, said check valving means for stopping the passing of air and water after a period of time; and another check valving means positioned at said end of said tubular member.

7. The apparatus of claim 6, further comprising:

a first line extending from said air compressing means into said interior volume of said tank; and a second line in communication with said air compressing means and with said tubular member.

8. The apparatus of claim 7, said tubular member having a ball positioned therein, said check valving means comprising a first seat positioned at said opposite end of said tubular member, said another check valving means comprising a second seat positioned at said end of said tubular member.

9. The apparatus of claim 8, said pressure switching means causing said ball to move from said second seat toward said first seat when said pressure switching means opens.

10. The apparatus of claim 9, said air compressing means for causing said ball to move from said first set to said second seat when said air compressing means passes air into said interior volume of said tank.

11. The apparatus of claim 8, said first line having a check valve at an end opposite said air compressing means, said second line connected to said first line and interconnected to said tubular member.

12. The apparatus of claim 9, further comprising:

a tank connector positioned on said side of said second seat opposite said bottom of said tank.

13. A device for removing moisture from a compressed air tank comprising:

a tubular member;

a spiral pathway formed along an inner wall of said tubular member, said spiral pathway comprising a coiled spring positioned against said inner wall of said tubular member;

a ball positioned in said tubular member and travelable along said spiral pathway; and a check valving means affixed to one end of said tubular member.

14. The device of claim 13, said check valving means having a hole formed therein having a diameter less than a diameter of said ball, said hole positioned in alignment with a central longitudinal axis of said tubular member.

15. The device of claim 13, further comprising:

another check valving means affixed to an opposite end of said tubular member.

16. The device of claim 13, said tubular member having an opposite end positioned adjacent a bottom of the tank, said tubular member extending vertically.

* * * * *